United States Patent [19]

Basalay et al.

[11] 4,015,063
[45] Mar. 29, 1977

[54] CRUDE OILS AND RESIDUAL FUEL OILS CONTAINING A TERPOLYMER OF ETHYLENE, VINYL ESTER, AND DIALKYLVINYL CARBINOL

[75] Inventors: Robert J. Basalay, Naperville; Peter G. Pappas, Downers Grove; Walter C. Edmisten, Olympia Fields, all of Ill.

[73] Assignee: Standard Oil Company (Indiana), Chicago, Ill.

[22] Filed: June 17, 1975

[21] Appl. No.: 587,635

Related U.S. Application Data

[62] Division of Ser. No. 522,471, Nov. 11, 1974, Pat. No. 3,915,668.

[52] U.S. Cl. .............................................. 526/331
[51] Int. Cl.² ....................................... C08F 218/12
[58] Field of Search ................ 260/80.75; 526/331

[56] References Cited

UNITED STATES PATENTS

| | | | |
|---|---|---|---|
| 3,313,789 | 4/1967 | Naarmann et al. | 260/80.75 |
| 3,471,459 | 10/1969 | Waples | 260/88.1 |
| 3,664,988 | 5/1972 | Trieschmann et al. | 260/80.75 |

*Primary Examiner*—John Kight, III
*Attorney, Agent, or Firm*—Philip Hill; Arthur G. Gilkes; William T. McClain

[57] ABSTRACT

Crude oils and residual fuel oils having improved pour point and flow properties are obtained by incorporating therein a small amount of a new terpolymer prepared from ethylene, a vinyl ester, and a dialkylvinyl carbinol. The terpolymer has a number average molecular weight of about 500–10,000 and suitably contains 45–80 wt. % ethylene, 10–25 wt. % vinyl ester of a fatty acid having up to about eight carbon atoms and 10–30 wt. % dialkylvinyl carbinol wherein the alkyl groups have up to about six carbon atoms.

4 Claims, No Drawings

CRUDE OILS AND RESIDUAL FUEL OILS CONTAINING A TERPOLYMER OF ETHYLENE, VINYL ESTER, AND DIALKYLVINYL CARBINOL

BACKGROUND OF THE INVENTION

This is a division of application Ser. No. 522,471, filed Nov. 11, 1974, now U.S. Pat. No. 3,915,668.

Crude oils and heavier fractions such as residual fuel oils contain substantial quantities of waxy material. When such oils are subjected to low temperatures, the waxy material crystallizes into long needles or platelets that agglomerate into a gel-like matrix. Crystallization of waxy material in this manner interferes with the free flow of oil and causes serious distribution and operating difficulties. For example, pumping from producing wells and from storage in tanks and transport through pipelines at low temperatures are difficult or impossible. In heating systems, flow through filters cannot be maintained with the result that the heating equipment fails to function.

The aforementioned difficulties have been remedied in part by addition of known pour point depressants. The pour point of an oil is defined as the lowest temperature at which the oil will flow when it is chilled without disturbance under specified conditions. The pour point so determined provides a measure of the lowest temperature permissible during storage, transport, or use of the oil. Pour depressants are essentially wax crystal modifiers. If upon cooling of the oil the solubility of the pour depressant is such that it comes out of solution before the wax, the depressant may act as a nucleating agent and promote the formation of small wax crystals that are less capable of forming a gel. If the depressant and wax come out of solution together, they may co-crystallize into bulky crystals that have a lower tendency to form a rigid gel. If the depressant comes out of solution after the wax, precipitation on the surface of the normally-formed wax crystals may inhibit the adhesion necessary to form a gel.

Recently, certain polymeric products have been made and proposed as pour point depressants in certain oils, particularly in distillate fuel oils. While effective in distillate fuel oils such known polymeric products generally are not sufficiently effective in residual fuels or in waxy crude oils. For example, U.S. Pat. No. 3,048,479 discloses copolymers of ethylene and vinyl acetate as pour point depressants for middle distillate fuel oils; however, such copolymers are marginally or not at all effective in residual fuel oils or in crude oils. Other such copolymers in the field are illustrated by the following patents: U.S. Pat. No. 2,499,723; U.S. Pat. No. 2,654,188; U.S. Pat. No. 3,093,723; U.S. Pat. No. 3,126,364; U.S. Pat. No. 3,236,612 and others.

The state of the art is further illustrated by the following patents. U.S. Pat. No. 3,447,915 teaches the use of terpolymers of ethylene, propylene, and an alkyl ester of acrylic acid or methacrylic acid as pour point depressants in fuel oils. The pour point depressant and flow improvers disclosed in U.S. Pat. No. 3,467,597 are terpolymers of ethylene, vinyl esters, e.g. vinyl acetate, and a mono-olefinically unsaturated polymerizable compound grafted with ethylene. U.S. Pat. No. 3,679,380 discloses middle distillate fuel composition containing a terpolymer of ethylene, propylene, and 1,4-hexadiene as pour point depressants to facilitate the movement of waxy crude oil through pipelines.

SUMMARY OF THE INVENTION

This invention is directed to new terpolymers that are effective in lowering pour point and improving flow properties of crude oils and residual fuel oils are prepared by copolymerizing ethylene, a vinyl ester of a fatty acid having up to about eight carbon atoms, and a dialkylvinyl carbinol, wherein the alkyl groups have up to about six carbon atoms, in the presence of a free radical catalyst. Suitably, the aforementioned monomers are copolymerized under conditions such that a terpolymer is produced containing about 45–80 wt. % ethylene, 10–25 wt. % of the vinyl ester, and 10–30 wt. % of the dialkylvinyl carbinol, and having a number average molecular weight in the range of about 500–10,000, preferably about 2,000–2,500. Within this relatively low molecular weight range we have found that our terpolymers possess unexpectedly high flow improvement activity. In contrast, such prior art products as ethylene-vinyl acetate copolymers must be prepared with number average molecular weights of about 10,000, and preferably about 25,000 in order to exhibit effective pour point lowering properties. Furthermore, the terpolymers of this invention, being of lower molecular weight, have lower viscosities and thus offer the advantages of better low temperature storage and handling properties and easier blending into oil stocks.

Methods for copolymerizing olefinic monomers in the presence of free radical catalysts are well known in the art. The copolymerization reaction can be carried out in solution, in emulsion, or in the vapor phase under a wide range of reaction temperatures and pressures and with a wide variety of free radical catalysts. Examples of free radical catalysts that can be used are azo-nitriles such as azo-bis-isobutyronitrile; alkyl peroxides such as t-butyl peroxide; acyl peroxides such as benzoyl peroxide; ketone peroxides such as methyl-ethyl ketone peroxide; hydroperoxides such as cumene hydroperoxide; and peresters such as t-butyl perbenzoate. Generally, for a given reaction temperature a catalyst is selected that generates free radicals at a rate such that the polymerization reaction is readily controllable.

For the preparation of our terpolymers the vinyl ester and the dialkylvinyl carbinol are preferably dissolved in an inert solvent such as benzene. The reaction vessel is flushed with ethylene and heated to a reaction temperature of about 75°–150° C, preferably about 95°–105° C. Ethylene is then pressured into a reaction vessel to a pressure of about 500–1,500 psi, preferably about 1,000–1,200 psi. About 0.1–5 wt. %, preferably about 1.0–2.0 wt. % of a catalyst such as azo-bis-isobutyronitrile is then added and the reaction mixture is held at reaction temperature for about 0.5–2 hours, suitably about 1 hour. The reaction mixture is then cooled, the pressure is reduced, solvent and unreacted monomers are separated by distillation, and the desired terpolymer is obtained.

The terpolymers so produced are effective in lowering pour point and improving flow properties of crude oils and residual fuel oils when added thereto in amounts, of from about 0.001 wt. % to about 5 wt. %, preferably from about 0.0025 wt. % to about 1 wt. %. Residual fuel oils are topped crude oils. For example, an "atmospheric" residual fuel oil is obtained by distillation of crude oil at atmospheric pressure to a specified end-point temperature, usually about 650° F. Residual fuel oils that can be employed in the practice of the present invention are further defined in ASTM Designation D-396 as No. 4, No. 5, and No. 6 fuel oils. Such oils have viscosities that fall in the range of from about 45 Saybolt Seconds Universal at 100° F to 300 Saybolt Seconds Furol at 122° F. Oils treated with our terpolymer may also contain other additives; for example, corrosion inhibitors, anti-oxidants, rust inhibitors, detergents, etc..

Our terpolymers, for convenience, may be prepared as addition agent concentrates. Accordingly, the terpolymers may be dissolved in a suitable organic solvent therefor in amounts greater than 5 wt. % and preferably about 25-75 wt. %. The solvent in such concentrates preferably has a distillation range of from about 100° F to about 700° F. Suitable organic solvents are hydrocarbon solvents, for example, petroleum fractions such as naphtha, kerosene, heater oil, and the like; aromatic hydrocarbons such as benzene, xylene, and toluene; or paraffinic hydrocarbons such as hexane, octane, etc.. The solvent employed should, of course, be selected with regard to the possible beneficial or adverse effects it may have on the final oil composition. Thus, the solvent used should preferably burn without leaving an objectionable residue, and should be non-corrosive with regard to metals.

PREFERRED EMBODIMENTS OF THE INVENTION

The following examples are illustrative of this invention.

Teropolymers of ethylene, vinyl acetate and dimethylvinyl carbinol, listed in Table I, were prepared as follows:

1. A one-liter autoclave was charged with 300g of benzene solution containing the weight percent of monomers indicated in the Table.

2. The autoclave was flushed with ethylene, heated to 100° C, and pressurized to 1,200 psig with ethylene.

3. A benzene solution containing 2.0% of azo-bis-isobutyronitrile was added at a rate of 1 ml/minute for 25 minutes.

4. The reaction mixture was heated to 100° C and then held at 100° C for 1 hour.

5. The pressure was thereafter reduced and the reaction mixture was stripped of benzene solvent and other volatile components to yield about 10g of terpolymer.

TABLE I

| TERPOLYMERS OF ETHYLENE, VINYL ACETATE, AND DIMETHYLVINYL CARBINOL | | | | |
|---|---|---|---|---|
| Terpolymer Sample | A | B | C | D |
| Vinyl Acetate in Benzene, wt. % | 10 | 10 | 10 | 15 |
| Dimethylvinyl Carbinol in Benzene, wt. % | 10 | 10 | 15 | 10 |
| Vinyl Acetate in Polymer, wt. % | 21 | 13.5 | 16 | 20 |
| Dimethylvinyl Carbinol in Polymer, wt. % | 15 | 27 | 25 | 20 |
| No. Average Molecular Weight | 2020 | 2251 | 2479 | 2136 |

The terpolymers of Table I were blended into various residual fuel oils and crude oils and the lowering of pour point was determined according to the procedure of ASTM Method D-97. The results, listed in Table II, demonstrate that the terpolymers of the present invention are effective in lowering the pour point of crude oils and residual fuel oils..

TABLE II

| FLOW IMPROVING PROPERTIES OF ETHYLENE, VINYL ACETATE, AND DIMETHYLVINYL CARBINOL TERPOLYMERS | | | | |
|---|---|---|---|---|
| | A | B | C | D |
| Terpolymer Sample | | Pour Point, ° F | | |
| 0.1% in Resid A(75°)[1] | 5, 10 | 5 | 10 | 5 |
| 0.07%  " | 20 | 15, 10 | 10 | 20 |
| 0.05%  " | 10 | 15, 25 | 20 | 30 |
| 0.03%  " | 30 | 20, 25 | 40 | 60 |
| 0.1% in Resid B(100°)[2] | 100 | 85, 95 | 80, 75 | 80, 75 |
| 0.03% in Crude A(10°)[3] | −20 | −30 | −25 | −25 |

[1]Domestic Atmospheric Residual Oil having a pour point of +75° F.
[2]Nigerian Atmospheric Residual Oil having a pour point of +100° F.
[3]Brut Arzew Yugoslavian Crude Oil having a pour point of +10° F.

Although the present invention has been described with reference to certain specific preferred embodiments thereof, the invention is not limited thereto, but includes within its scope such modifications and variations as come within the scope and spirit of the appended claims.

We claim:

1. An oil-soluble terpolymer composition consisting of 45-80 wt. % ethylene, 10-25 wt. % vinyl ester of a fatty acid having up to about eight carbon atoms, and 10-30 wt. % of a dialkylvinyl carbinol wherein the alkyl groups have up to about six carbon atoms, said terpolymer having a number average molecular weight in the range of from about 500 to about 10,000.

2. The terpolymer composition of claim 1 wherein the vinyl ester in vinyl acetate.

3. The terpolymer composition of claim 1 wherein the dialkylvinyl carbinol is dimethylvinyl carbinol.

4. The terpolymer composition of claim 1 wherein the number average molecular weight is in the range of from about 2,000 to about 2,500.

* * * * *